United States Patent
Kang et al.

(10) Patent No.: US 8,355,357 B2
(45) Date of Patent: Jan. 15, 2013

(54) APPARATUS AND METHOD FOR ADMISSION CONTROL FOR SERVICE FLOW IN BROADBAND WIRELESS ACCESS COMMUNICATION SYSTEM USING MULTI-HOP RELAY SCHEME

(75) Inventors: Hyun-Jeong Kang, Seoul (KR); Won-Il Roh, Yongin-si (KR); Taori Rakesh, Suwon-si (KR); Jung-Je Son, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 566 days.

(21) Appl. No.: 12/400,524

(22) Filed: Mar. 9, 2009

(65) Prior Publication Data
US 2009/0225695 A1 Sep. 10, 2009

(30) Foreign Application Priority Data

Mar. 10, 2008 (KR) ........................ 10-2008-0022070
Mar. 14, 2008 (KR) ........................ 10-2008-0024087

(51) Int. Cl.
*H04B 7/14* (2006.01)
*H04J 3/14* (2006.01)
*H04W 72/08* (2009.01)
*H04L 12/28* (2006.01)

(52) U.S. Cl. ... 370/315; 370/332; 370/232; 370/395.21; 370/338; 455/7

(58) Field of Classification Search .................. 370/315, 370/330, 332, 395.21, 468, 232, 328, 229, 370/230, 238, 252, 338, 329; 455/11.1, 7
See application file for complete search history.

(56) References Cited

U.S. PATENT DOCUMENTS 6,243,387 B1 * 6/2001 Hjalmtysson et al. ........ 370/410
7,467,208 B1 * 12/2008 Hurtta et al. .................. 709/227
(Continued)

FOREIGN PATENT DOCUMENTS
EP 1 773 091 A2 4/2007
(Continued)

OTHER PUBLICATIONS

Hyunjeong Lee et al., 802.16j (Mobile Multihop Relay) Technical Requirements, IEEE 802.16 Broadband Wireless Access Working Group, Jul. 1, 2007.
(Continued)

*Primary Examiner* — Kwang B Yao
*Assistant Examiner* — Candal Elpenord
(74) *Attorney, Agent, or Firm* — Jefferson IP Law, LLP

(57) ABSTRACT

An apparatus and method for an admission control for a service flow in a broadband wireless access communication system using a multi-hop relay scheme is provided. In a method for operating a relay station in a broadband wireless communication system using a multi-hope relay scheme, a request message requesting an admission control decision for a service flow is received from an upper node. It is determined whether a requested QoS parameter set included in the request message is supportable. If the requested QoS parameter set is supportable, the request message is forwarded to a subordinate relay station corresponding to a next hop in a data transmission path. If the requested QoS parameter set is unsupportable, a response message indicating the unsupportability of the requested QoS parameter set is transmitted to a base station.

26 Claims, 9 Drawing Sheets

U.S. PATENT DOCUMENTS

| | | | |
|---|---|---|---|
| 7,912,477 B2 * | 3/2011 | Tamura et al. | 455/452.2 |
| 7,917,149 B2 * | 3/2011 | Chen et al. | 455/450 |
| 7,941,149 B2 * | 5/2011 | Wang et al. | 455/445 |
| 7,986,623 B2 * | 7/2011 | Bardalai | 370/230 |
| 8,081,628 B2 * | 12/2011 | Wu et al. | 370/390 |
| 2003/0202476 A1 | 10/2003 | Billhartz et al. | |
| 2004/0192204 A1 | 9/2004 | Periyalwar et al. | |
| 2005/0048914 A1 | 3/2005 | Sartori et al. | |
| 2006/0045050 A1 * | 3/2006 | Floros et al. | 370/332 |
| 2006/0218353 A1 * | 9/2006 | Livet et al. | 711/141 |
| 2007/0178880 A1 * | 8/2007 | Saito et al. | 455/405 |
| 2008/0002608 A1 * | 1/2008 | Zheng et al. | 370/328 |
| 2008/0025280 A1 * | 1/2008 | Hsu et al. | 370/341 |
| 2008/0219255 A1 * | 9/2008 | Tsai et al. | 370/389 |
| 2009/0092083 A1 | 4/2009 | Shagdar et al. | |
| 2009/0109891 A1 * | 4/2009 | Fonseca et al. | 370/315 |

FOREIGN PATENT DOCUMENTS

| | | |
|---|---|---|
| WO | 2005/025110 A2 | 3/2005 |
| WO | 2007/102208 A1 | 9/2007 |

OTHER PUBLICATIONS

Mary Chion, "Service Flow Management Clarification." IEEE 802.16 Broadband Wirelss Access Working Group, Sep. 19, 2007.

* cited by examiner

APPARATUS AND METHOD FOR ADMISSION CONTROL FOR SERVICE FLOW IN BROADBAND WIRELESS ACCESS COMMUNICATION SYSTEM USING MULTI-HOP RELAY SCHEME

PRIORITY

This application claims the benefit under 35 U.S.C. §119(a) of a Korean patent application filed in the Korean Intellectual Property Office on Mar. 10, 2008 and assigned Serial No. 10-2008-0022070 and a Korean patent application filed in the Korean Intellectual Property Office on Mar. 14, 2008 and assigned Serial No. 10-2008-0024087, the entire disclosures of both of which are hereby incorporated by reference.

BACKGROUND OF THE INVENTION

1. Field of the Invention

The present invention relates to a Broadband Wireless Access (BWA) communication system using a multi-hop relay scheme. More particularly, the present invention relates to an apparatus and method for a signaling process of a Relay Station (RS) and a Base Station (BS) to perform an admission control for a service flow.

2. Description of the Related Art

Extensive research is being conducted to provide various Quality of Service (QoS) features with a data rate of about 100 Mbps in the fourth-generation (4G) communication system. The 4G communication system is evolving to provide mobility, high data rate transmission, and high QoS in a Broadband Wireless Access (BWA) communication system such as a Local Area Network (LAN) system and a Metropolitan Area Network (MAN) system. Example of the BWA system include systems based on the Institute of Electrical and Electronics Engineers (IEEE) 802.16d and IEEE 802.16e standards, which are hereafter referred to as the IEEE 802.16d and IEEE 802.16e systems.

The IEEE 802.16d system and the IEEE 802.16e system use an Orthogonal Frequency Division Multiplexing (OFDM)/Orthogonal Frequency Division Multiple Access (OFDMA) scheme.

FIG. 1 is a block diagram of a conventional IEEE 802.16e system.

Referring to FIG. 1, the IEEE 802.16e system has a multi-cell structure. The IEEE 802.16e system includes a cell 100, a cell 150, a BS 110 managing the cell 100, a BS 140 managing the cell 150, and a plurality of Mobile Stations (MSs) 111, 113, 130, 151 and 153. The signal exchange between the BSs 110 and 140 and the MSs 111, 113, 130, 151 and 153 is performed using an OFDM/OFDMA scheme. The MS 130 is located in a boundary region (i.e., a handover region) between the cells 100 and 150. When the MS 130 moves from the cell 100 of the BS 110 into the cell 150 of the BS 140 while communicating with the BS 110, the serving BS of the MS 130 is changed from the BS 110 to the BS 140.

Because a signaling communication between a stationary BS and an MS is performed through a direct link as illustrated in FIG. 1, the IEEE 802.16e system can provide a reliable wireless link between the BS and the MS. However, because the BS is stationary, the IEEE 802.16e system has low flexibility in constructing a wireless network. Accordingly, in the IEEE 802.16e system, it is difficult to provide an efficient communication service in a radio environment where traffic distribution or call requirements change frequently.

In order to address this problem, a stationary RS, a mobile RS or general MSs can be used to apply a multi-hop relay data transmission scheme to a cellular communication system such as the IEEE 802.16e system. The use of the multi-hop relay wireless communication system makes it possible to rapidly reconfigure a network in response to a change in the communication environment and to operate the entire wireless network more efficiently. For example, the multi-hop relay wireless communication system can expand a cell coverage area and increase a system capacity. When channel conditions between a BS and an MS are poor, an RS may be installed between the BS and the MS to establish a multi-hop relay link therebetween, thereby making it possible to provide the MS with a radio channel having better channel conditions. In addition, the multi-hop relay scheme is used in a cell boundary region with poor channel conditions, thereby making it possible to provide a high-rate data channel and to expand the cell coverage area.

FIG. 2 is a block diagram of a conventional BWA communication system that uses a multi-hop relay scheme to expand a BS coverage area.

Referring to FIG. 2, the multi-hop relay BWA communication system has a multi-cell structure. The multi-hop relay BWA communication system includes a cell 200, a cell 240, a BS 210 managing the cell 200, a BS 250 managing the cell 240, a plurality of MSs 211 and 213 located within the cell 200, a plurality of MSs 221 and 223 located in a region 230 outside the cell 200 of the BS 210 and communicating with the BS 210, an RS 220 providing a multi-hop relay path between the BS 210 and the MSs 221 and 223 located in the region 230, a plurality of MSs 251, 253 and 255 located in the cell 240, a plurality of MSs 261 and 263 located in a region 270 outside the cell 240 of the BS 250 and communicating with the BS 250, and an RS 260 providing a multi-hop relay path between the BS 250 and the MSs 261 and 263 located in the region 270. An OFDM/OFDMA scheme is used for communication among the BS 210 and 250, the RS 220 and 260, and the MSs 211, 213, 221, 223, 251, 253, 255, 261, and 263.

Although the MSs 211 and 213 located in the cell 200 and the RS 220 can directly communicate with the BS 210, the MSs 221 and 223 located in the region 230 cannot directly communicate with the BS 210. Therefore, the RS 220 serves the region 230 to relay signals between the BS 210 and the MSs 221 and 223. That is, the MSs 221 and 223 can communicate with the BS 210 through the RS 220. Further, the RS 260 and the MSs 251, 253, and 255 located in the cell 240 can directly communicate with the BS 250, the MSs 261 and 263 located in the region 270 cannot directly communicate with the BS 250. Therefore, the RS 260 serves the region 270 to relay signals between the BS 250 and the MSs 261 and 263. That is, the MSs 261 and 263 can communicate with the BS 250 through the RS 260.

FIG. 3 is a block diagram of a conventional BWA communication system that uses a multi-hop relay scheme to increase a system capacity.

Referring to FIG. 3, the multi-hop relay BWA communication system includes a BS 310, a plurality of MSs 311, 313, 321, 323, 331, and 333, and RSs 320 and 330 providing multi-hop paths between the BS 310 and the MSs 311, 313, 321, 323, 331, and 333. The BS 310, the MSs 311, 313, 321, 323, 331, and 333, and the RSs 320 and 330 communicate with one another using an OFDM/OFDMA scheme. The BS 310 manages a cell 300. The RSs 320 and 330 and the MSs 311, 313, 321, 323, 331, and 333 that are in the cell 300 directly communicate with the BS 310.

When some MSs 321, 323, 331, and 333 are in a boundary region of the cell 300, Signal-to-Noise Ratios (SNRs) of direct links between the BS 310 and the MSs 321, 323, 331, and 333 may be low. In this case, the RS 320 relays traffic between the BS 310 and the MSs 321 and 323. The MSs 321 and 323 communicate traffic with the BS via the RS 320. Further, the RS 330 relays traffic between the BS 310 and the MSs 331 and 333. The MSs 331 and 333 communicate traffic with the BS via the RS 330. The RSs 320 and 330 provide high-rate data paths to the MSs 321, 323, 331, and 333, thereby increasing the effective transfer rates of the MSs 321, 323, 331, and 333 and the capacity of the multi-hop relay BWA communication system.

In the multi-hop relay BWA communication systems of FIGS. 2 and 3, one or more of the RSs 220, 260, 320, and 330 may be infrastructure RSs that are installed by a service provider and managed by the BSs 210, 250, and 310, or may be client RSs that operate as Subscriber Stations (SSs), MSs, or RSs. In addition, one or more of the RSs 220, 260, 320, and 330 may be stationary RSs, nomadic RSs (e.g., notebooks), or mobile RSs having mobility similar to an MS.

In the multi-hop relay BWA communication system, if a new service flow for an MS is created or the QoS parameter of the current service flow for the MS is changed while the MS is communicating with a BS directly or through an RS, the BS and the RS must be able to support the parameter of the new service flow or the new QoS parameter of the current service flow.

The service flow parameter of the MS may be determined by a QoS policy server in the network. In order to determine the service flow parameter, the QoS policy server obtains supportable parameter information from the BS and the RS. Herein, the supportable parameter information is obtained through the admission control of the corresponding nodes (i.e., the BS and the RS).

What is therefore required is a signaling process by which the corresponding nodes in the data transmission path of the MS can perform the admission control when a new service flow for the MS is created or the parameter of the current service flow for the MS is changed in the multi-hop relay system BWA communication system.

SUMMARY OF THE INVENTION

An aspect of the present invention is to address at least the above-mentioned problems and/or disadvantages and to provide at least the advantages described below. Accordingly, an aspect of the present invention is to provide a signaling apparatus and method for performing an admission control for a service flow in a multi-hop relay BWA communication system.

Another aspect of the present invention is to provide a signaling apparatus and method for performing, by nodes in the data transmission path of an MS, an admission control for a service flow of the MS in a multi-hop relay BWA communication system.

In accordance with an aspect of the present invention, a method for operating a relay station in a wireless communication system using a multi-hop relay scheme is provided. The method includes receiving a request message requesting an admission control decision for a service flow from an upper node, determining whether a requested QoS parameter set included in the request message is supportable, if the requested QoS parameter set is supportable, forwarding the request message to a subordinate relay station corresponding to a next hop in a data transmission path, and if the requested QoS parameter set is unsupportable, transmitting a response message indicating the unsupportability of the requested QoS parameter set to a base station.

In accordance with another aspect of the present invention, a method for an admission control for a service flow in a wireless communication system using a multi-hop relay scheme is provided. The method includes if a service flow change for a mobile station is requested, transmitting a request message requesting an admission control decision from a base station to a relay station in a data transmission path between the base station and the mobile station, performing, by the relay station, an admission control based on a requested QoS parameter set included in the request message, and if the requested QoS parameter set is supportable, forwarding the request message from the relay station to a subordinate relay station corresponding to a next hop in the data transmission path.

In accordance with still another aspect of the present invention, an apparatus for a relay station in a wireless communication system using a multi-hop relay scheme is provided. The apparatus includes a receiver for receiving a request message requesting an admission control decision for a service flow from an upper node, a controller for determining whether a requested QoS parameter set included in the request message is supportable, and a transmitter for transmitting the request message to a subordinate relay station corresponding to a next hop in a data transmission path if the requested QoS parameter set is supportable, and for transmitting a response message indicating the unsupportability of the requested QoS parameter set to a base station if the requested QoS parameter set is unsupportable.

In accordance with even another aspect of the present invention, a method for operating a base station in a wireless communication system using a multi-hop relay scheme is provided. The method includes if a service flow change for a mobile station is requested, transmitting a request message requesting an admission control decision to a relay station in a data transmission path between a base station and the mobile station, receiving a response message to the request message from the relay station, performing an admission control for the service flow based on the information included in the response message, and transmitting a message including the admitted service flow to the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiment of the present invention are intended to provide a scheme for a signaling process between a Base Station (BS) and a Relay Station (RS) to perform an admission control for a service flow of an MS in a multi-hop relay Broadband Wireless Access (BWA) communication system.

For example, the multi-hop relay BWA communication system uses an Orthogonal Frequency Division Multiplexing (OFDM) scheme or an Orthogonal Frequency Division Multiple Access (OFDMA) scheme. Thus, the multi-hop relay BWA communication system can transmit physical channel signals using a plurality of subcarriers, thereby enabling high-rate data transmission. In addition, the multi-hop relay BWA communication system can provide a multi-cell structure, thereby supporting the mobility of an MS.

In the following description, the multi-hop relay BWA communication system is taken as an example to describe exemplary embodiments of the present invention. However, the present invention can also be applied to any other cellular communication systems that use a multi-hop relay scheme.

Figure 1:
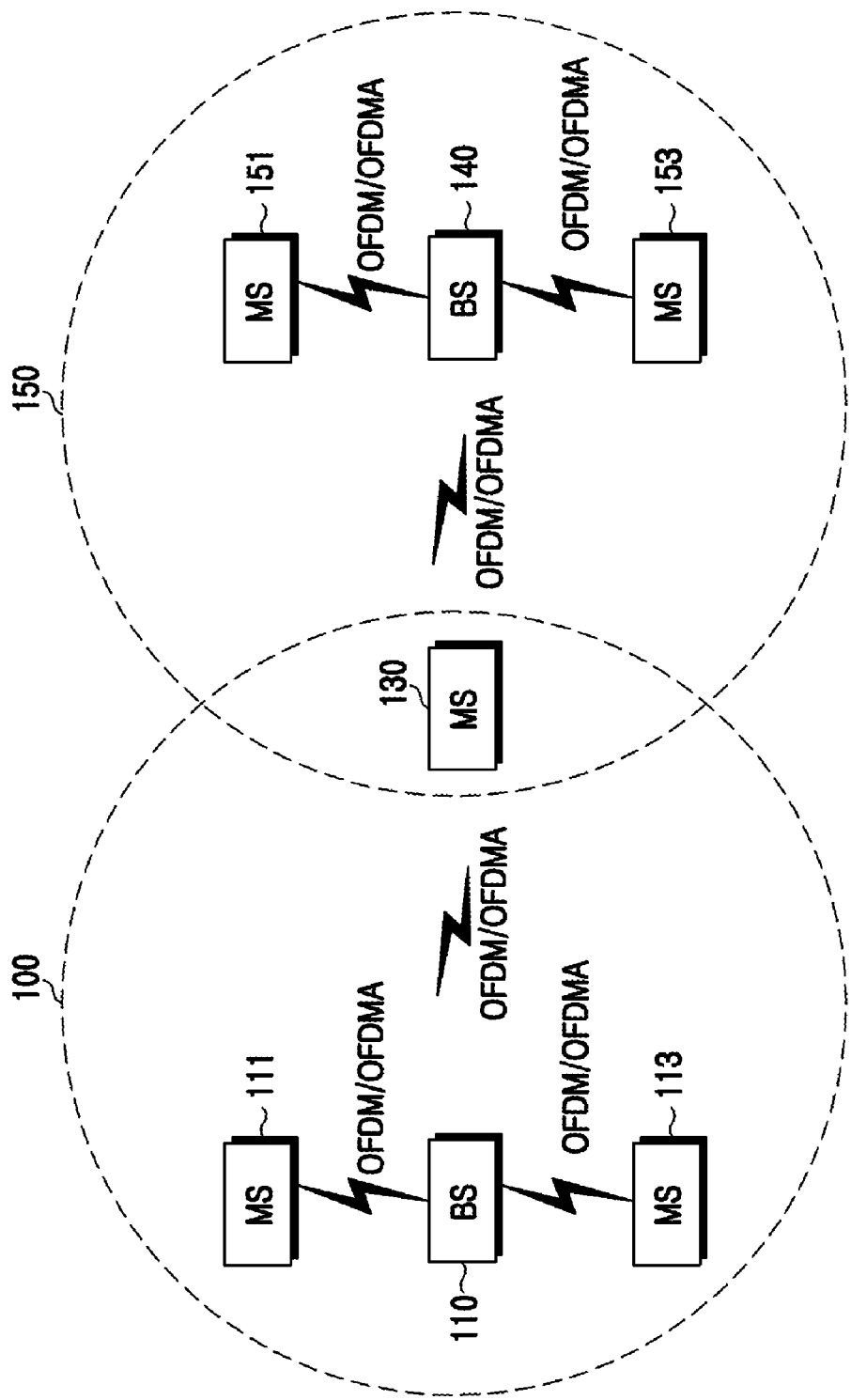
FIG. 1 is a block diagram of a conventional Institute of Electrical and Electronics Engineers (IEEE) 802.16e system.
Figure 2:
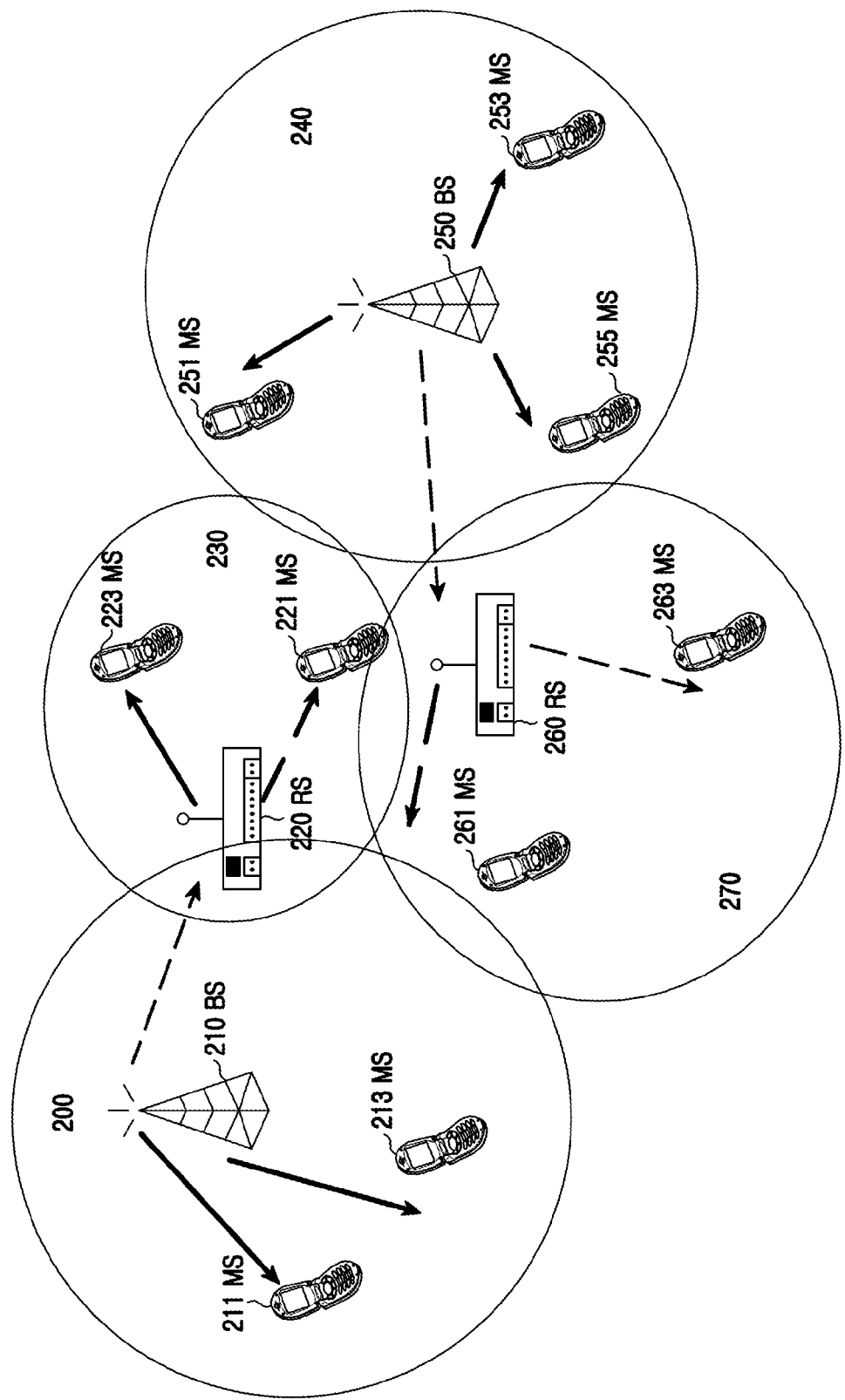
FIG. 2 is a block diagram of a conventional Broadband Wireless Access (BWA) communication system that uses a multi-hop relay scheme to expand a Base Station (BS) coverage area.
Figure 3:
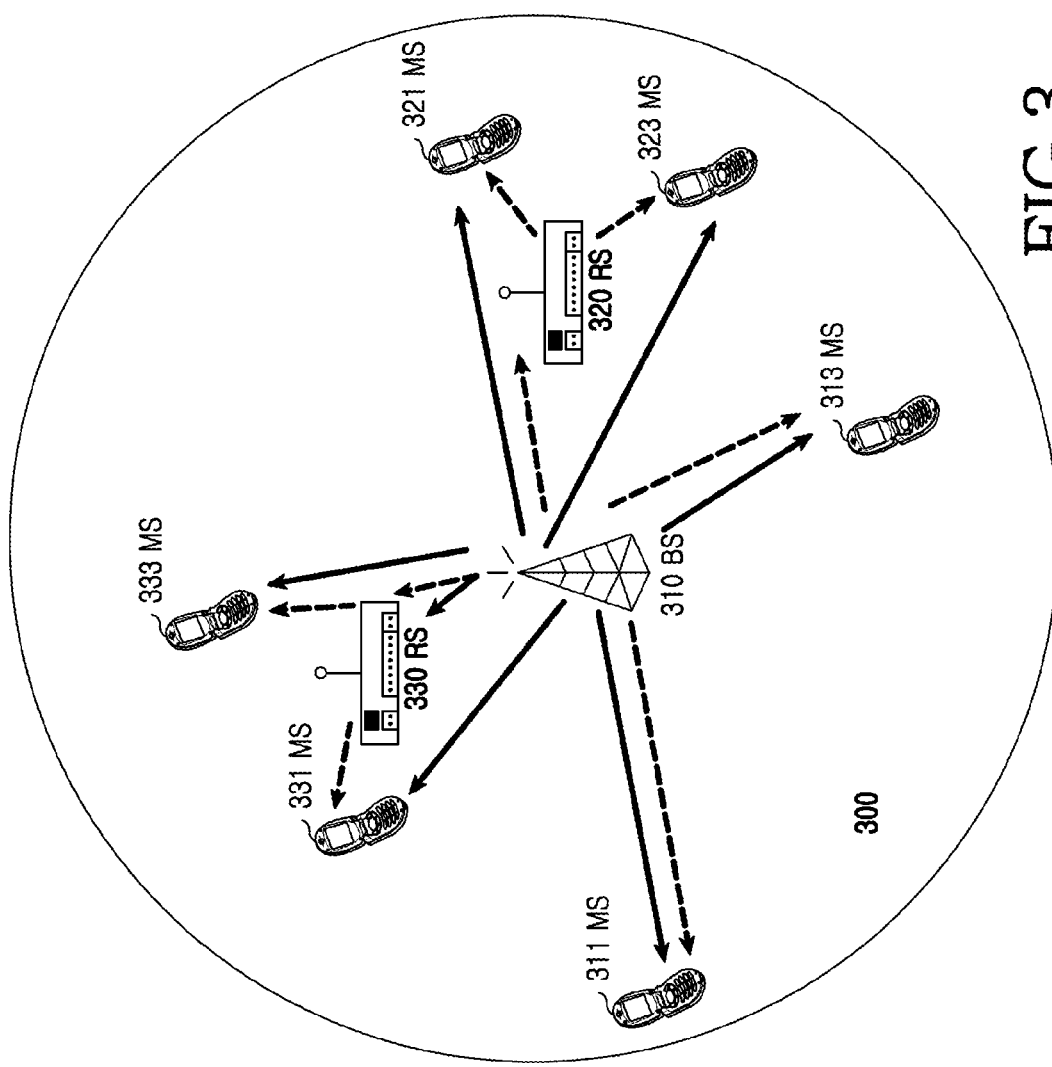
FIG. 3 is a block diagram of a conventional BWA communication system that uses a multi-hop relay scheme to increase a system capacity.
Figure 4:
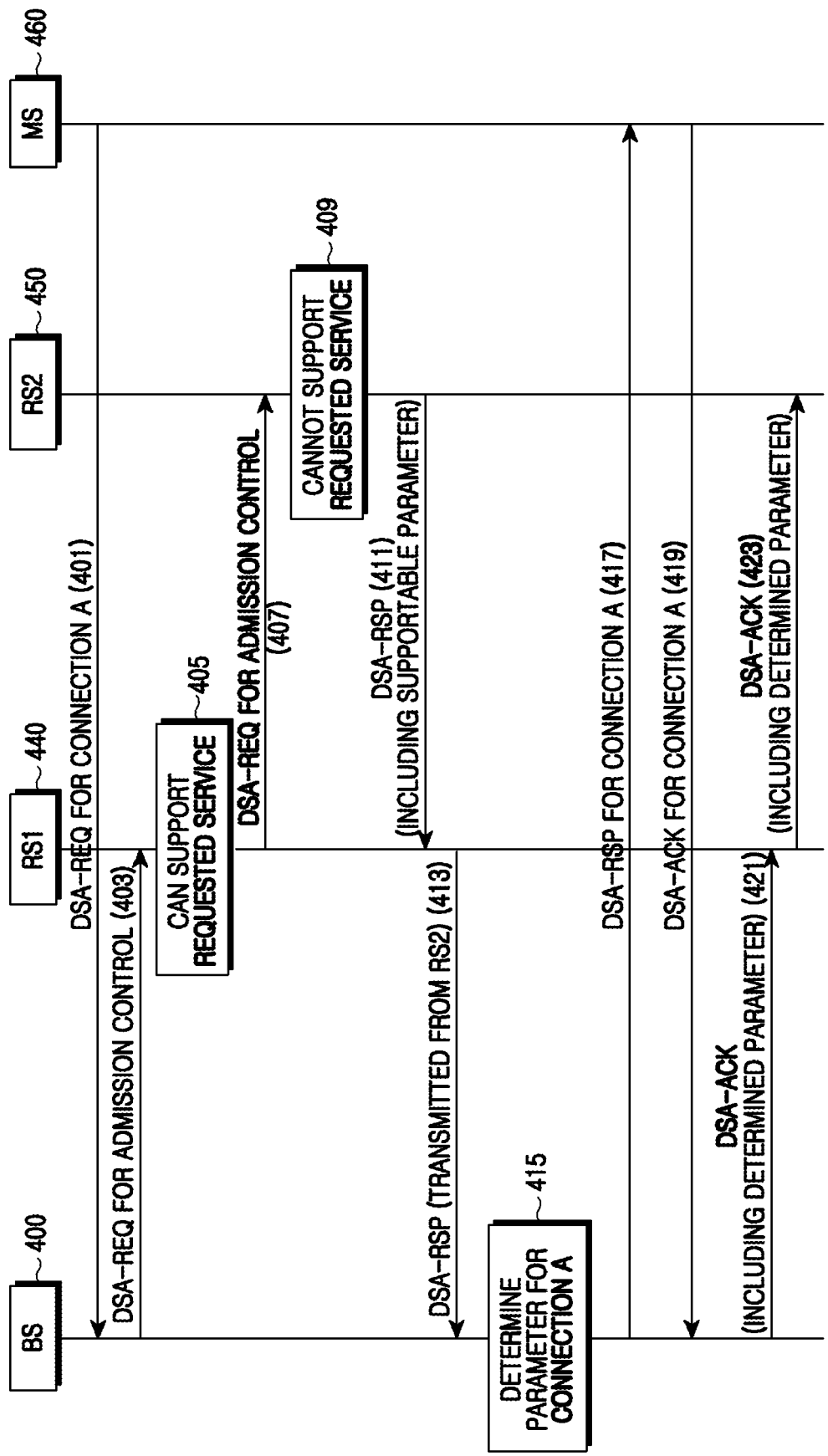
FIG. 4 is a flow diagram illustrating a signal flow for performing an admission control for a service flow addition request of an MS in a multi-hop relay BWA communication system according to an exemplary embodiment of the present invention.

FIG. 4 is a flow diagram illustrating a signal flow for performing an admission control for a service flow addition request of an MS in a multi-hop relay BWA communication system according to an exemplary embodiment of the present invention.

Referring to FIG. 4, an MS 460 transmits a Dynamic Service Addition-REQuest (DSA-REQ) message to a BS 400 in order to create a new connection A, in step 401. Herein, the DSA-REQ message may include parameter information for a service flow (e.g., a Quality of Service (QoS) parameter set and a QoS profile identifier).

In step 403, the BS 400 transmits the DSA-REQ message including the service flow parameter for the connection A, received from the MS 460, to an RS1 440. The DSA-REQ message is intended for all RSs located in the data transmission path of the MS 460 and is a query as to whether to admit the service flow parameter for the connection A.

In step 405, the RS1 440 performs an admission control by using the service flow parameter included in the DSA-REQ message. That is, the RS1 440 determines whether the requested QoS parameter set can be supported. Herein, it is assumed that the service flow parameter is admitted. If the service flow parameter is admitted, the RS1 440 forwards the DSA-REQ message to the subordinate RS2 450 corresponding to the next hop in the data transmission path of the MS 460, in step 407.

In step 409, the RS2 450 performs an admission control by using the requested service flow parameter included in the DSA-REQ message. Herein, it is assumed that the service flow parameter is not admitted. If the requested QoS parameter set is unsupportable, the RS2 450 transmits a Dynamic Service Addition-ReSPonse (DSA-RSP) message indicating the unsupportability of the requested QoS parameter set to the RS1 440 in step 411 and the RS1 440 forwards the DSA-RSP message to the BS 400 in step 413. The DSA-RSP message may include a confirmation code indicating the unsupportability of the requested QoS parameter set and an acceptable QoS parameter set that is acceptable in the RS2 450. Herein, the QoS parameter information that is acceptable in the RS2 450 may include a parameter unsupportable among the requested QoS parameter set and a parameter value supportable for the parameter in the RS2 450.

For example, when a minimum traffic amount, which is one of the parameters among the requested QoS parameter set for the connection A included in the DSA-REQ message received in step 407, is 50, and if the RS2 450 can support 30 for the minimum traffic amount, the DSA-RSP message may include a supportable parameter value '30' for the minimum traffic amount.

The information collected from the RSs in the corresponding path may be used to determine whether to support the service flow of the corresponding MS. In addition, if the service flow is unsupportable, the information may be used as a triggering point for a handover of the MS to the supportable RS or BS, or may be used as the load control information of the BS.

In step 415, the BS 400 performs an admission control for the connection A based on the information included in the received DSA-RSP message and determines the parameter for the connection A according to the admission control result. Although it has been described that the QoS parameter determination for the connection A is performed by the BS 400, the QoS parameter determination may be performed by a policy server. Herein the signaling between the policy server and the BS 400 is conventional and thus its detailed description will be omitted for conciseness. The parameter for the connection A determined in step 415 may be the service flow parameter corrected based on the information collected from the RS2 450, or may be the information indicating the impossibility of the service of the connection A.

The policy server may define a QoS parameter for each QoS flow (e.g., UGS, nrtPS, rtPS, and ertPS), a maximum sustained rate, a minimum reserved rate, a maximum latency, and a grant interval. If a new service is initiated, the MS transmits a session initiation through an application layer to a corresponding network entity (e.g., an Internet protocol Multimedia Subsystem (IMS)) of a Core Service Network (CSM) and the corresponding network entity triggers the policy server. Then, the policy server may transmit a QoS parameter set for the requested service through an application layer to the MS, or may transmit a DSA trigger including the QoS parameter set to a corresponding service BS. In the former case, the MS may transmit a DSA-REQ message including the QoS parameter set to a BS, and in the latter case, a BS may transmit the DSA-REQ message to the MS, thereby initiating a signaling negotiation. In the case of the multi-hop system, because a service level is different for each node, a QoS parameter set change of the flow may be requested as described above (in step 415). In this case, if a BS has an allowable range for each parameter of a corresponding QoS flow, the BS may correct a parameter for a corresponding service flow within the allowable range. If the BS does not have the allowable range, the BS may request a policy server to determine a parameter for a corresponding service flow and may receive the determined service flow parameter from the policy server.

In step 417, the BS 400 transmits a DSA-RSP message including the determined parameter to the MS 460 through the RS1 440 and the RS2 450. In step 419, the MS 460 transmits a DSA-ACKnowledgement (DSA-ACK) message to the BS 400 in response to the DSA-RSP message.

In step 421, the BS 400 transmits a DSA-ACK message including the service flow parameter determined for the connection A to the RS1 440. In step 423, the RS1 440 transmits the DSA-ACK message to the RS2 450 corresponding to the next hop. That is, the determined service flow parameter is notified to the RSs on the service path of the MS. Thereafter, the BS 400 and the RSs 440 and 450 provide a corresponding service to the MS 460 based on the determined service flow parameter.

Although the process of FIG. 4 has been described on the assumption of the case of the MS requesting the creation of a connection (MS_init DSA), the admission control process of FIG. 4 may also be performed in the case of the BS requesting the creation of a connection (BS_init DSA), in the case of the MS requesting the service flow parameter change for the created connection (MS_init DSC (Dynamic Service Change)), and in the case of the BS requesting the service flow parameter change for the created connection (BS_init DSC). If the service flow parameter for the created connection is to be changed, DSC-REQ/DSC-RSP/DSC-ACK messages may be used instead of the DSA-REQ/DSA-RSP/DSA-ACK messages.

Hereinafter, a description will be given of an admission control process in the case of transmitting data of an MS by using a tunneling mode. That is, a description will be given of an admission control process considering the case where a service flow parameter of a tunnel, which is created between a BS and an access node of an MS (e.g., a terminal RS in the data transmission path of an MS) is changed. Herein, the case where the service flow parameter of the tunnel is changed may include the case where a new connection using the tunnel is added and the case where a service flow parameter value of the created connection using the tunnel is changed.

Figure 5:
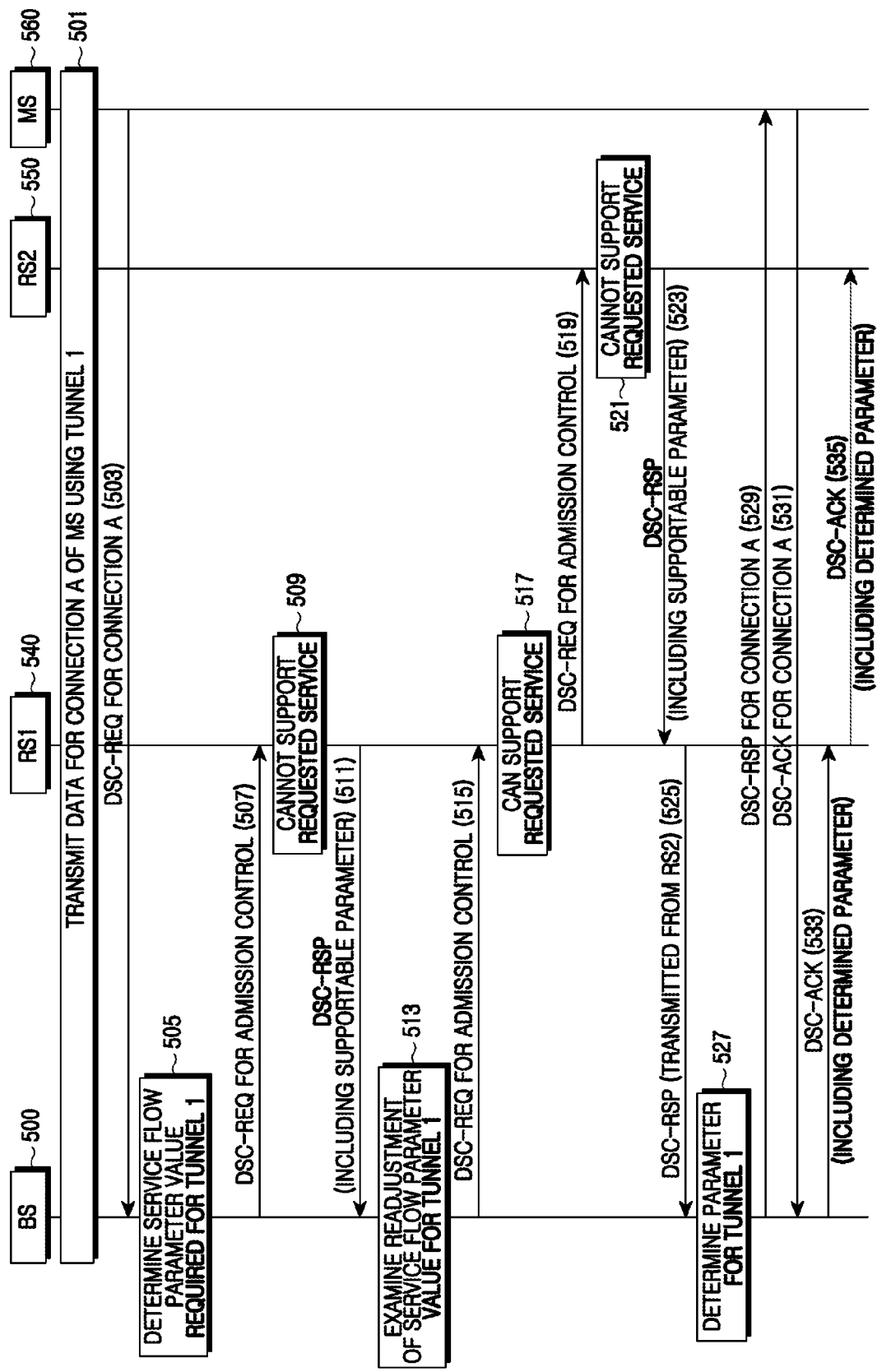
FIG. 5 is a flow diagram illustrating an admission control process for a service flow change for a tunnel in a multi-hop relay BWA communication system according to an exemplary embodiment of the present invention.

FIG. 5 is a flow diagram illustrating an admission control process for a service flow change for a tunnel in a multi-hop relay BWA communication system according to an exemplary embodiment of the present invention.

Referring to FIG. 5, it is assumed that, for data transmission for a connection A of an MS 560, a tunnel 1 is established between a BS 500, an RS1 540 and an RS2 550 located in the data path of the MS and the tunnel 1 has a separate service flow parameter (QoS parameter set). In step 501, the BS 500, the RS1 540 and the RS2 550 transmit data for the connection A of the MS 560 by using the tunnel 1.

If a service flow parameter change for the connection A of the MS 560 is necessary, the MS 560 transmits a DSC-REQ message requesting a change of a service flow parameter value for the connection A to the BS 500 in step 503.

In step 505, the BS 500 performs an admission control based on the information included in the DSC-REQ message. Herein, if it is determined through the admission control that a change of a service flow parameter set in the tunnel 1 is necessary, the BS 500 determines a service flow parameter value required in the tunnel 1.

In step 507, the BS 500 transmits a DSC-REQ message including the determined service flow parameter value of the tunnel 1 to the RS1 540. In step 509, the RS1 540 performs an admission control based on the information included in the DSC-REQ message. That is, the RS1 540 determines whether the requested QoS parameter set is supportable. Herein, it is assumed that the corresponding service flow parameter is not admitted. If the service flow parameter is not admitted, the RS1 540 generates a DSC-RSP message including a QoS parameter set supportable by the RS1 540 and a confirmation code indicating the unsupportability of the QoS parameter set requested for the tunnel 1 and transmits the generated DSC-RSP message to the BS 500, in step 511. That is, the DSC-RSP message may include a service flow parameter unsupportable by the RS1 540 and a service flow parameter value acceptable by the RS1 540 for the parameter.

In step 513, the BS 500 determines whether the service flow parameter value for the tunnel 1 is readjustable, or determines whether to reject a service flow parameter change request for the connection A of the MS, because the service flow parameter value for the tunnel 1 is not readjustable. Herein, it is assumed that the service flow parameter value for the tunnel 1 is readjusted. If the service flow parameter value for the tunnel 1 is readjusted, the BS 500 transmits a DSC-REQ message including the readjusted service flow parameter for the tunnel 1 to the RS1 540, in step 515.

In step 517, the RS1 540 determines whether the readjusted service flow parameter for the tunnel 1 is admissible. Herein, it is assumed that the readjusted service flow parameter is admitted. That is, if it is determined that the requested QoS parameter set is unsupportable, the RS1 540 forwards a DSC-REQ message including the requested QoS parameter set to the subordinate RS2 550 corresponding to the next hop in the data transmission path of the MS, in step 519.

In step 521, the RS2 550 performs an admission control based on the information included in the received DSC-REQ message. Herein, it is assumed that the corresponding service flow parameter is not admitted. If the service flow parameter is not admitted, the RS2 550 transmits a DSC-RSP message, including a confirmation code indicating the unsupportability of the QoS parameter set requested for the tunnel 1 and a service flow parameter value acceptable by the RS2 550 for the service flow parameter unsupportable by the RS2 550, to the RS1 540 in step 523. In step 525, the RS1 540 forwards the DSC-RSP message to the BS 500.

In step 527, based on the information included in the DSC-REQ message received from the RS2 550, the BS 500 determines whether the service flow parameter value for the tunnel 1 is readjustable, or determines whether to reject a service flow parameter change request for the connection A of the MS, because the service flow parameter value for the tunnel 1 is not readjustable. Herein, it is assumed that the service flow parameter value for the tunnel 1 is readjusted.

In step 529, the BS 500 transmits a DSC-RSP message including the determined QoS parameter set for the tunnel 1 to the MS 560. Herein, the determined QoS parameter set for the tunnel 1 may be the service flow parameter updated based on the information received from the RS2 550, or the information indicating the unacceptability of the service flow parameter change for the connection A requested by the MS 560.

In step 531, the MS 560 transmits a DSC-ACK message to the BS 500 in response to the DSC-RSP message. In step 533, the BS 500 transmits a DSC-ACK message including the parameter determined for the tunnel 1 to the RS1 540 located on the service path of the MS. In step 535, the RS1 540 sets the information included in the DSC-ACK message (service flow parameters) in a corresponding table, and forwards the DSC-ACK message to the RS2 550 corresponding to the next hop located on the service path of the MS. Then, the RS2 550 sets the information included in the DSC-ACK message in a corresponding table. Thereafter, the BS 500 and the RSs 540 and 550 provide a service to the MS 560 based on the service flow parameter negotiated as described above.

Figure 6:
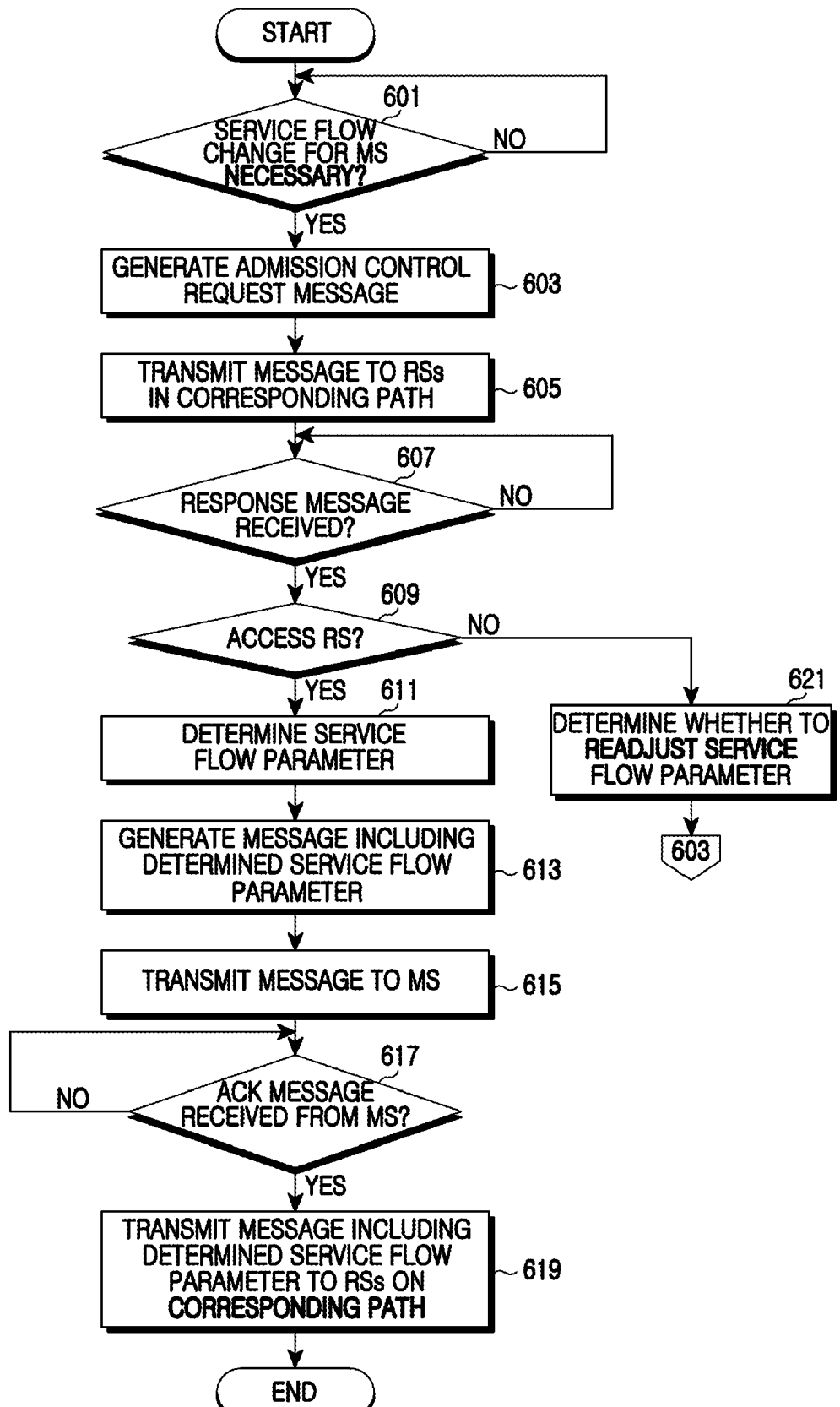
FIG. 6 is a flowchart illustrating an operation of a BS in a multi-hop relay BWA communication system according to an exemplary embodiment of the present invention.

FIG. 6 is a flowchart illustrating an operation of a BS in the multi-hop relay BWA communication system according to an exemplary embodiment of the present invention.

Referring to FIG. 6, the BS determines whether a service flow change for an MS is necessary, in step 601. Herein, the service flow change may be may be generated in the case of the MS requesting a creation of a connection, in the case of the BS requesting a creation of a connection, in the case where the MS changes a service flow parameter for the created connection (including both of an individual connection and a tunneling connection), and in the case where the BS changes a service flow parameter for the created connection (including both of an individual connection and a tunneling connection). A new connection may be created through a DSA process, and a service flow parameter of the created connection may be changed through a DSC process.

If the service flow change for the MS is necessary, the BS generates an admission control request message in step 603. Herein, the admission control request message may be one a DSA-REQ message and a DSC-REQ message or may be anther message that is defined separately.

In step 605, the BS transmits the admission control request message to RSs in the data transmission path of the corresponding MS. Herein, the admission control request message includes a service flow parameter (QoS parameter set) requesting an admission control.

Thereafter, in step 607, the BS determines whether a response message for the admission control request message is received. Herein, the response message may be one of a DSA-RSP message and a DSC-RSP message or may be another message that is defined separately.

If the response message for the admission control request message is received, the BS determines whether the response message is received from an access RS of the MS (e.g., the last RS in the corresponding path), in step 609. If the response message is not received from the access RS, the BS proceeds to step 621. In step 621, based on the information included in the response message, the BS determines whether to readjust a service flow parameter or whether to reject a service flow change (creation or parameter change) of the MS. Herein, if the service flow parameter is to be readjusted, the BS returns to step 603 to again transmit an admission control request to the RSs in the corresponding path.

If the response message is received from the access RS, the BS proceeds to step 611. In step 611, the BS determines a service flow parameter based on the information included in the response message. Herein, the service flow parameter may be readjusted or the service flow change for the MS may be rejected.

Thereafter, in step 613, the BS generates a message including the determined service flow parameter. Herein, the message may be one of a DSA-RSP message and a DSC-RSP message or may be another message that is defined separately.

In step 615, the BS transmits the generated message to the MS. In step 617, the BS determines whether a corresponding ACK message is received from the MS. If the ACK message is received from the MS, the BS proceeds to step 619. In step 619, the BS transmits a message including the determined service flow parameter to the RSs in the corresponding path. Herein, the message may be one of a DSA-ACK message and a DSC-ACK message or may be other message that is defined separately. The service flow parameter determined through the above process is set in a corresponding database (memory), and the BS provides a service to the MS based on the set service flow parameter.

Figure 7:
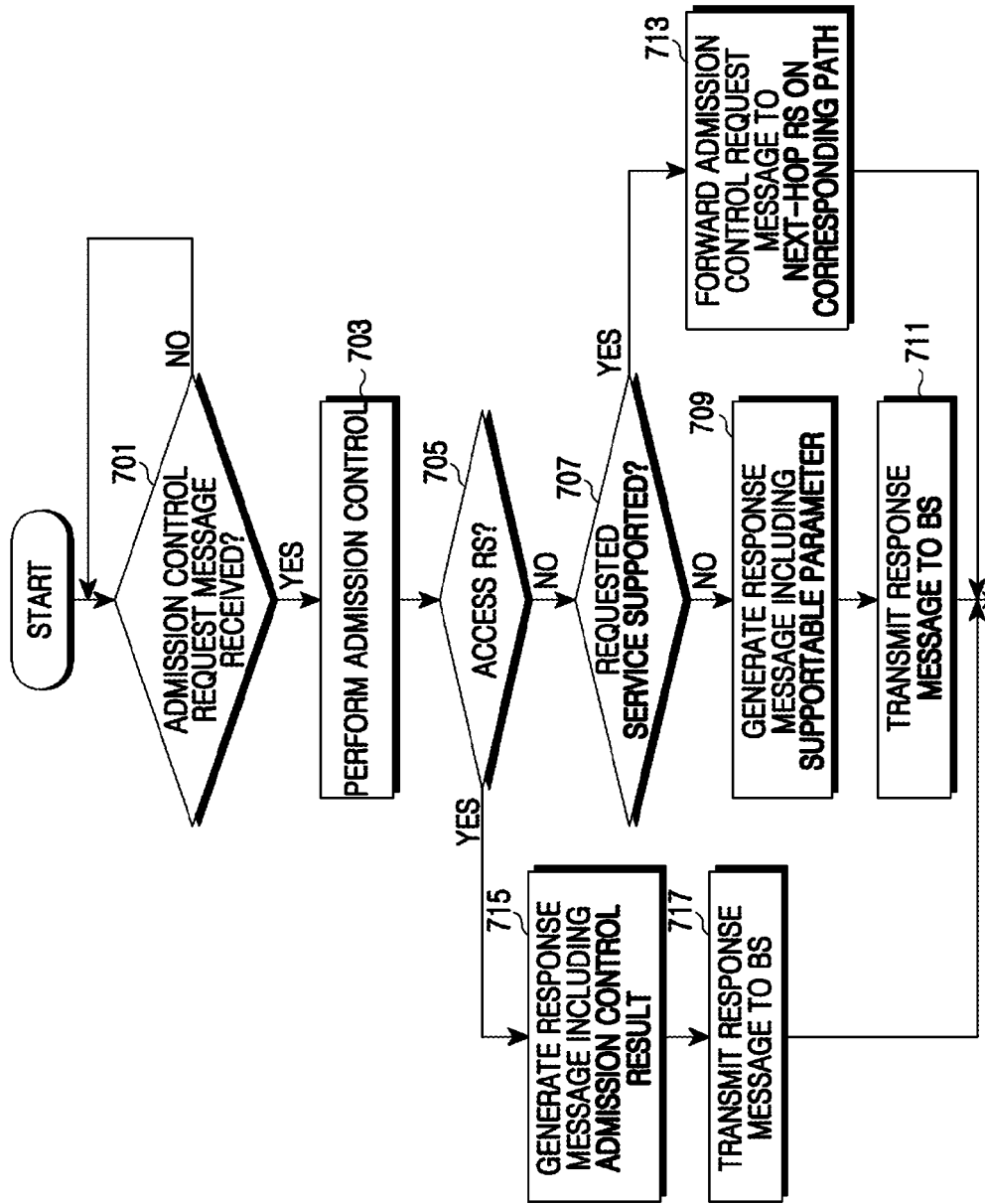
FIG. 7 is a flowchart illustrating an operation of a Relay Station (RS) in a multi-hop relay BWA communication system according to an exemplary embodiment of the present invention.

FIG. 7 is a flowchart illustrating an operation of an RS in the multi-hop relay BWA communication system according to an exemplary embodiment of the present invention.

Referring to FIG. 7, the RS determines whether an admission control request message is received from an upper node (a BS or an upper RS), in step 701. Herein, the admission control request message may be one of a DSA-REQ message and a DSC-REQ message or may be another message that is defined separately. Herein, the admission control request message includes service flow parameter information (QoS parameter set) requesting an admission control.

If the admission control request message is received, the RS performs an admission control based on the requested QoS parameter set included in the message, in step 703. That is, the RS determines whether the requested QoS parameter set is supportable. In step 705, the RS determines whether it is an access RS located at the end of a data transmission path.

If the RS is not the access RS (in step 705), that is, if there is a next-hop RS (i.e., a subordinate RS), the RS proceeds to step 707. In step 707, the RS determines from the admission control result whether the requested QoS parameter set is admitted. If the requested QoS parameter set is admitted, the RS proceeds to step 713. In step 713, the RS forwards the admission control request message received from the upper node (or superordinate node) to a next-hop RS in the corresponding path.

On the other hand, if the requested QoS parameter set is unsupportable, the RS proceeds to step 709. In step 709, the RS generates a response message indicating the unsupportability of the requested QoS parameter set. In step 711, the RS transmits the generated response message to a BS.

On the other hand, if the RS is the access RS (in step 705), the RS proceeds to step 715. In step 715, the RS generates a response message including the admission control result. In step 717, the RS transmits the response message to the BS.

The response message for the admission control request may include a confirmation code indicating the unsupportability of the requested QoS parameter set and acceptable parameter information (an unsupportable parameter identifier and a supportable value for the corresponding parameter). In addition, the response message may be one of a DSA-RSP message and a DSC-RSP message or may be another message that is defined separately.

Meanwhile, the RS may receive a message (DSA-ACK, DSC-ACK) including service parameter information determined by the BS after the process of FIG. 7. If the message is received, the RS sets the determined service parameter in a memory. Thereafter, the RS provides a service to a corresponding MS based on the set service flow parameter.

Figure 8:
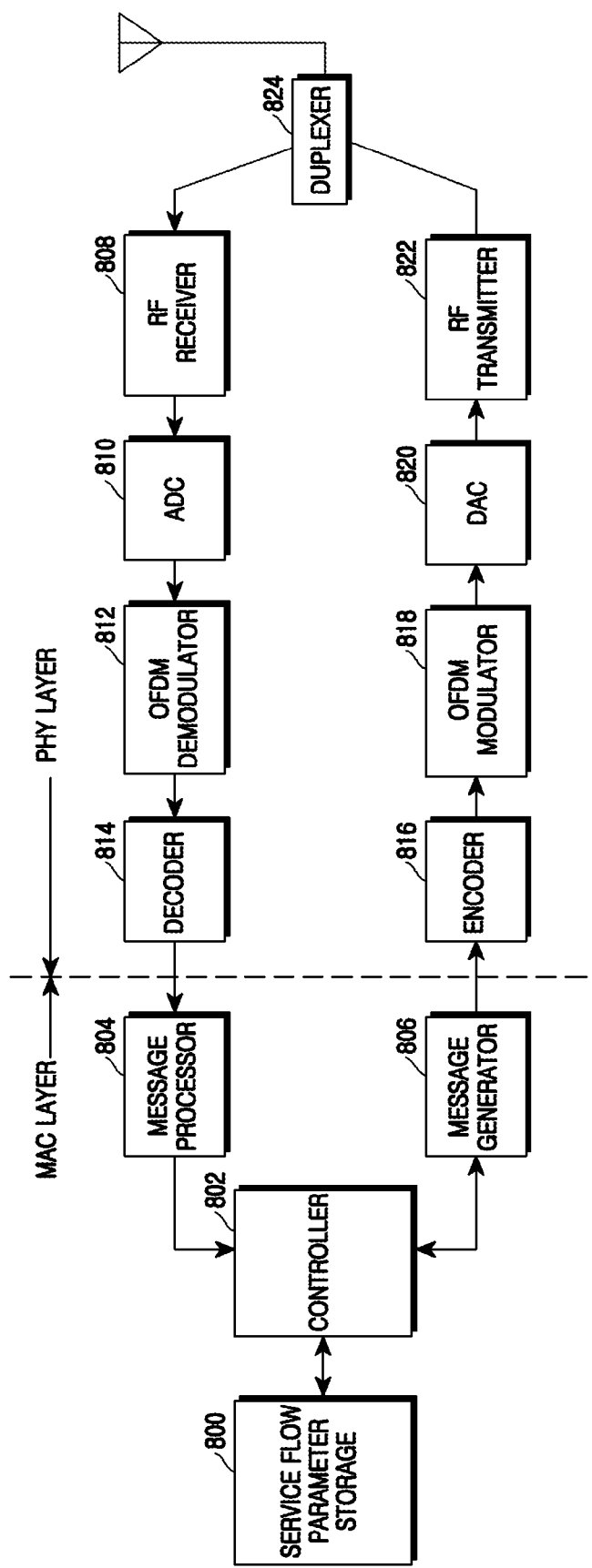
FIG. 8 is a block diagram of a BS (or RS) according to an exemplary embodiment of the present invention.

FIG. 8 is a block diagram of a BS (or RS) according to an exemplary embodiment of the present invention.

Since the BS and the RS have substantially the same interface module (communication module) and substantially the same block configuration, the configurations and operations of the BS and the RS will be described with reference to the block diagram illustrated in FIG. 8. The following description is made in the context of a Time Division Duplex-Orthogonal Frequency Division Multiple Access (TDD-OFDMA) communication system, to which the present invention is not limited. Thus, it is to be clearly understood that exemplary embodiments of the present invention are applicable to a hybrid communication system using a TDD scheme and a Frequency Division Duplex (FDD) scheme in combination and to a cellular communication system using any other resource allocation scheme.

Referring to FIG. 8, the BS (or RS) includes a service flow parameter storage 800, a controller 802, a message processor 804, a message generator 806, a Radio Frequency (RF) receiver 808, an Analog-to-Digital Converter (ADC) 810, an OFDM demodulator 812, a decoder 814, an encoder 816, an OFDM modulator 818, a Digital-to-Analog Converter (DAC) 820, an RF transmitter 822, and a duplexer 824.

Based on a duplexing scheme, the duplexer 824 transfers a TX signal received from the RF transmitter 822 to an antenna and transfers an RX signal received from the antenna to the RF receiver 808. For example, based on a TDD scheme, the duplexer 824 transfers a TX signal received from the RF transmitter 822 to the antenna in a TX mode and transfers an RX signal received from the antenna to the RF receiver 808 in an RX mode.

The RF receiver 808 converts an RF signal received through the antenna into a baseband analog signal. The ADC 810 samples the analog signal received from the RF receiver 808 to convert the analog signal into sample data. Using Fast Fourier Transform (FFT), the OFDM demodulator 812 transforms the sample data into frequency-domain data and selects data of subcarriers from the frequency-domain data.

The decoder 814 demodulates and decodes the selected data from the OFDM demodulator in accordance with a predefined Modulation and Coding Scheme (MCS) level. The message processor 804 analyzes a control message from the decoder 814 and provides the resulting information to the controller 802.

The controller 802 controls a corresponding operation based on the information received from the message processor 804, generates TX information, and provides the TX information to the message generator 806. Herein, it is assumed that the controller 802 performs an admission control for a service flow parameter. The service flow parameter storage 800 manages service flows created for MSs and manages a service flow parameter (a QoS parameter set) admitted for each service flow.

The message generator 806 generates a message using a variety of information received from the controller 802 and provides the message to the encoder 816 of a physical layer.

The encoder 816 encodes and modulates data received from the message generator 806 according to a predefined MCS level. The OFDM modulator 818 Inverse Fast Fourier Transform (IFFT)-processes data received from the encoder 816 to output sample data (OFDM symbols). The DAC 820 converts the sample data into an analog signal. The RF transmitter 822 converts the analog signal received from the DAC 820 into an RF signal to transmit the RF signal through the antenna.

In the above-described configuration, the controller 802 serves as a protocol controller that controls the message processor 804 and the message generator 806. The controller 802 may perform the functions of the message processor 804 and the message generator 806. Although separate units are provided for respective functions of the controller 802, the controller 802 may perform all or some of the respective functions instead of the separate units.

In addition, the controller 802 receives information necessary for a protocol process from the corresponding unit of the physical layer, or provides a control signal to the corresponding unit of the physical layer.

The operations of the BS and the RS will now be described with reference to the configuration illustrated in FIG. 8, focusing on a signaling process performed in a Media Access Control (MAC) layer.

The operation of the BS will be described first.

The controller 802 determines whether a service flow change for an MS is necessary. If the service flow change (including service flow creation and parameter change for the created service flow) is necessary, the controller 802 triggers the message generator 806. Then, under the control of the controller 802, the message generator 806 generates an admission control request message (e.g., a DSA-REQ message or a DSC-REQ message) and transmits the same to a physical layer unit. Herein, the admission control request message may include QoS parameter set information for requesting an admission control. Meanwhile, the message generated by the message generator 806 is processed into a transmittable form by the physical layer prior to transmission to a corresponding RS.

Thereafter, the controller 802 determines whether a response message for the admission control request message is received. If the response message is received, the controller 802 determines whether a service flow parameter readjustment is necessary, whether to reject a service flow change for an MS, or whether to finally set a service flow parameter.

If the service flow parameter is readjusted, the message generator 806 generates an admission control request message including the readjusted service flow parameter and transmits the same to the physical layer unit. The generated admission control request message is physical-layer encoded prior to transmission to the corresponding RS.

If the service flow parameter is finally set, the message generator 806 generates a message (e.g., a DSA-RSP message or a DSC-RSP message) including the final service flow parameter and transmits the same to the physical layer unit. The generated message is physical-layer encoded prior to transmission to the corresponding MS.

Thereafter, if a corresponding ACK message (e.g., a DSA-ACK message or a DSC-ACK message) is received from the MS, the message generator 806 generates a message (e.g., a DSA-ACK message or a DSC-ACK message) including the final service flow parameter and transmits the same to the physical layer unit. The generated message is physical-layer encoded prior to transmission to the RSs in the corresponding path.

Meanwhile, the final service flow parameter is stored in the service flow parameter storage 800. Thereafter, the controller 802 provides a service to the corresponding MS based on the service flow parameter stored in the storage 800.

The operation of the RS will now be described.

The controller 802 determines whether an admission control request message is received from an upper node (a BS or an upper RS). If the admission control request message is received, the controller 802 performs an admission control based on the requested QoS parameter set in the message.

If the RS is an access RS located at the end of the corresponding path, the message generator 806 generates a response message (e.g., a DSA-RSP message or a DSC-RSP message) including the admission control result. The generated message is physical-layer encoded prior to transmission to a BS.

If the RS is not the access RS and cannot support the requested QoS parameter set, the message generator 806 generates an admission control request message including the corresponding service flow parameters. The generated message is physical-layer encoded prior to transmission to a next-hop RS in the corresponding path.

If the RS is not the access RS and cannot support the requested QoS parameter set, the message generator 806 generates a response message (e.g., a DSA-RSP message or a DSC-RSP message) including a confirmation code indicating the unsupportability of the requested QoS parameter set and acceptable QoS parameter information. The generated message is physical-layer encoded prior to transmission to the BS.

Meanwhile, the controller 802 determines whether the final service flow parameter (e.g., a DSA-ACK message or a DSC-ACK message) is received from the upper node. If the final service parameter is received, the controller 802 stores the same in the service flow parameter storage 800. Thereafter, the controller 802 provides a service to the corresponding MS based on the service flow parameter stored in the storage 800.

Figure 9:
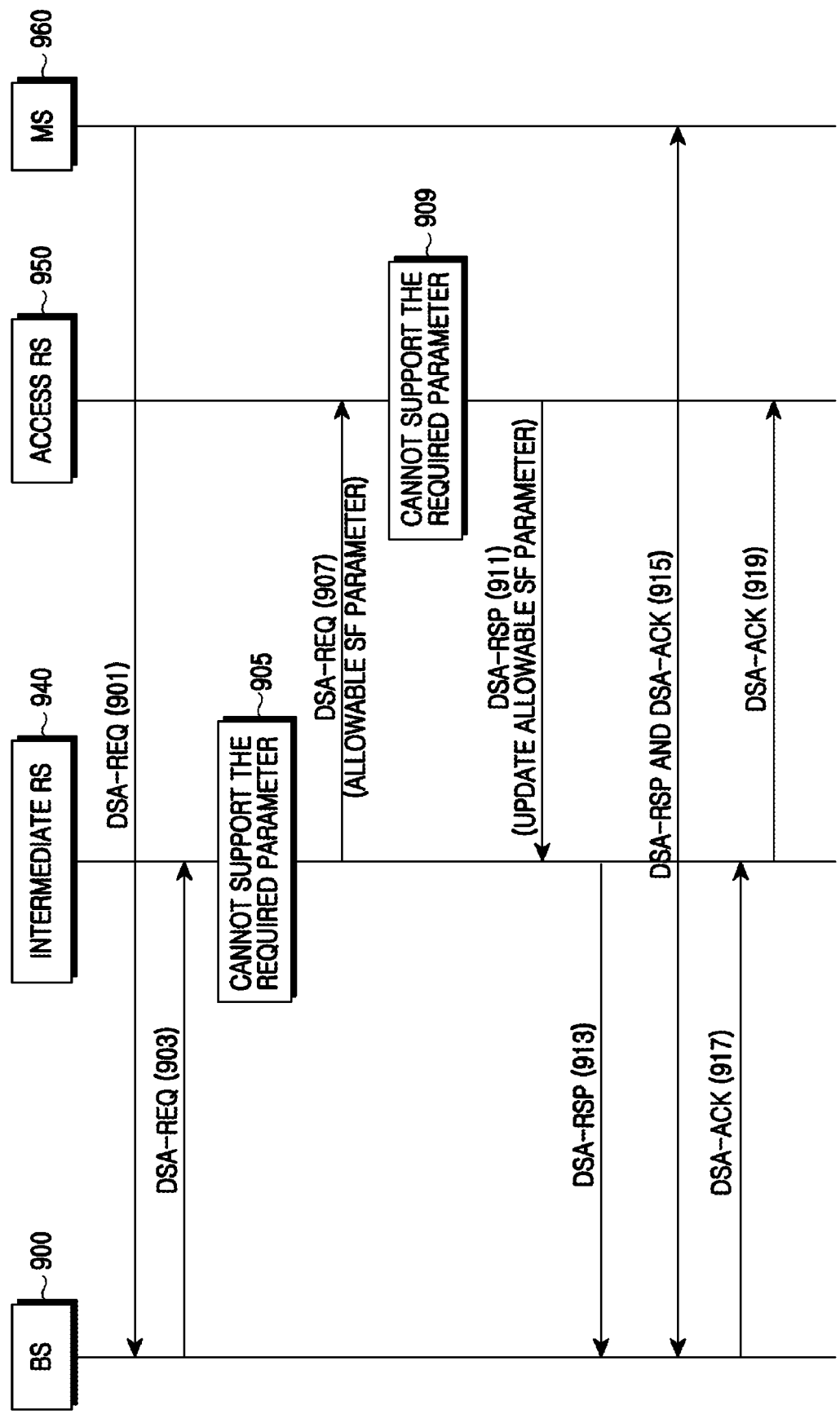
FIG. 9 is a flow diagram illustrating a signal flow for performing an admission control for a service flow addition request of an MS in a multi-hop relay BWA communication system according to another exemplary embodiment of the present invention.

FIG. 9 is a flow diagram illustrating a signal flow for performing an admission control for a service flow addition request of an MS in a multi-hop relay BWA communication system according to another exemplary embodiment of the present invention.

Referring to FIG. 9, an MS 960 transmits a DSA-REQ message for creation of a new connection to a BS 900, in step 901. In step 903, the BS 900 transmits a DSA-REQ message including a requested QoS parameter set to intermediate RS 940, which is the data transmission path of the MS 960.

In step 905, the intermediate RS 940 performs an admission control based on the requested QoS parameter set included in the DSA-REQ message received from the BS. That is, the intermediate RS 940 determines whether the requested QoS parameter set is supportable. Herein, if the requested QoS parameter set is supportable, the intermediate RS 940 would transmit the DSA-REQ message to a subordinate (access) RS 950 of the next hop.

If the requested QoS parameter set is not admitted, the RS 940 includes an acceptable service flow parameter value in a DSA-REQ message received from the BS and transmits the DSA-REQ message to the next-hop RS in step 907. In this example, it is assumed in that the requested QoS parameter set is not supported in the intermediate RS 940.

In addition, the next-hop RS performs an admission control based on the requested service flow parameter in the DSA-REQ message received from the upper RS. Herein, if the requested service flow parameter is not admitted, the corresponding intermediate RS includes an acceptable service flow parameter value in a DSA-REQ message and transmits the DSA-REQ message to the next-hop RS. Herein, if the service flow parameter value supportable in the upper RS is already included in the DSA-REQ message received from the upper RS, the upper RS adds or updates the acceptable service flow parameter value and transmits the corresponding DAS-REQ message to the next-hop RS.

If the DSA-REA message is transmitted to the access RS 950 (i.e., the last RS in the data transmission path of the MS) through the above process, the access RS 950 performs an admission control based on the requested QoS parameter set in the DSA-REQ message, in step 909. In this example, it is assumed in that the requested QoS parameter set is not supported by Access RS 950. Herein, if the requested QoS parameter set is not admitted, the access RS 950 adds or updates an acceptable service flow parameter value and transmits a DSA-RSP message including the same to the RS 940, in step 911. In step 913, the RS 940 forwards the DSA-RSP message to the BS 900. Herein, the DSA-RSP message may include a confirmation code indicating the unsupportability of the requested QoS parameter set and QoS parameter information acceptable for the RSs in the MS path. The information included in the DSA-RSP message may be used by the BS and a policy server to determine the service flow parameter of the MS.

Meanwhile, if the DSA-RSP message is received, the BS 900 determines the service flow parameter of the MS and transmits a DSA-RSP message including the determined service flow parameter to the MS 960 and the MS 960 transmits a DSA-ACK message to the BS 900, in step 915.

In step 917, the BS 900 transmits a DSA-ACK message including the determined service flow parameters to the RS 940. In step 919, the RS 940 transmits the DSA-ACK message to the RS 950.

The operation illustrated in FIG. 9 may be applied to the case of the MS service flow being added or updated by the BS (BS-initiated), the case of the created service flow being updated by the MS (MS-initiated), and the case of the tunnel service flow being added or updated.

As described above, exemplary embodiments of the present invention define the signaling between a BS and one or more RSs for admission control for a QoS parameter of a service flow in a multi-hop relay system. Thus, the BS can manage the resource condition of the RS. In addition, based on the resource condition of the RS, the BS can reconstruct the path for supporting the service for the MS or can easily perform the handover control for the MS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a relay station in a wireless communication system using a multi-hop relay scheme, the method comprising
receiving a request message requesting an admission control decision for a service flow from an upper node;
determining whether a requested QoS parameter set included in the request message is supportable;
if the requested QoS parameter set is supportable, forwarding the request message to a subordinate relay station corresponding to a next hop in a data transmission path without transmitting a response message to a base station; and if the requested QoS parameter set is unsupportable, transmitting a response message indicating the unsupportability of the requested QoS parameter set to the base station without forwarding the request message to the subordinate relay station corresponding to the next hop in the data transmission path, wherein the response message includes at least one of a Confirmation Code (CC) indicating the unsupportability of the requested QoS parameter set and a QoS parameter set which the relay station can support.

2. The method of claim 1, wherein the request message comprises one of a Dynamic Service Addition-REQuest (DSA-REQ) message and a Dynamic Service Change-REQuest (DSC-REQ) message.

3. The method of claim 1, wherein the response message comprises one of a Dynamic Service Addition-ReSPonse (DSA-RSP) message and a Dynamic Service Change-ReSPonse (DSC-RSP) message.

4. The method of claim 1, further comprising;
receiving an ACKnowledge (ACK) message including an admitted service flow parameter from the base station; and
setting the admitted service flow parameter.

5. The method of claim 4, wherein the ACK message comprises one of a DSA-ACK message and a DSC-ACK message.

6. The method of claim 1, wherein the service flow comprises one of an individual service flow and a tunnel service flow.

7. A method for an admission control for a service flow in a wireless communication system using a multi-hop relay scheme, the method comprising:
if a service flow change for a mobile station is requested, transmitting a request message requesting an admission control decision from a base station to a relay station in a data transmission path between the base station and the mobile station;
performing, by the relay station, an admission control based on a requested QoS parameter set included in the request message;
if the requested QoS parameter set is supportable, forwarding the request message from the relay station to a subordinate relay station corresponding to a next hop in the data transmission path without transmitting a response to the base station; and
if the requested QoS parameter set is unsupportable, transmitting a response message indicating the unsupportability of the requested QoS parameter set from the relay station to the base station without forwarding the request message to the subordinate relay station corresponding to the next hop in the data transmission path,
wherein the response message includes at least one of a Confirmation Code (CC) indicating the unsupportability of the requested QoS parameter set and a QoS parameter set which the relay station can support.

8. The method of claim 7, wherein the request message comprises one of a Dynamic Service Addition-REQuest (DSA-REQ) message and a Dynamic Service Change-REQuest (DSC-REQ) message.

9. The method of claim 7, wherein the response message comprises one of a Dynamic Service Addition-ReSPonse (DSA-RSP) message and a Dynamic Service Change-ReSPonse (DSC-RSP) message.

10. The method of claim 7, further comprising performing, by the base station, an admission control upon receipt of the response message from the relay station;
transmitting a message including an admitted service flow parameter from the base station to the mobile station; and
transmitting an ACKnowledge message including the admitted service flow parameter from the base station to one or more relay stations in the data transmission path.

11. The method of claim 10, wherein the ACK message comprises one of a DSA-ACK message and a DSC-ACK message.

12. The method of claim 7, wherein the service flow change for the mobile station is requested when at least one of the mobile station requests creation of a connection, the base station requests creation of a connection, the mobile station requests a service flow parameter change for a created connection, and the base station requests a service flow parameter change for the created connection.

13. The method of claim 7, wherein the service flow comprises one of an individual service flow and a tunnel service flow.

14. An apparatus for a relay station in a wireless communication system using a multi-hop relay scheme, the apparatus comprising:
a receiver for receiving a request message requesting an admission control decision for a service flow from an upper node;
a controller for determining whether a requested QoS parameter set included in the request message is supportable; and
a transmitter for transmitting the request message to a subordinate relay station corresponding to a next hop in a data transmission path without transmitting a response message to a base station if the requested QoS parameter set is supportable, and for transmitting a response message indicating the unsupportability of the requested QoS parameter set to the base station without transmitting the request message to the subordinate relay statin corresponding to the next hop in the data transmission path if the requested QoS parameter set is unsupportable,
wherein the response message includes at least one of a Confirmation Code (CC) indicating the unsupportability of the requested QoS parameter set and a QoS parameter set which the relay station can support.

15. The apparatus of claim 14, wherein the request message comprises one of a Dynamic Service Addition-REQuest (DSA-REQ) message and a Dynamic Service Change-REQuest (DSC-REQ) message.

16. The apparatus of claim 14, wherein the response message comprises one of a Dynamic Service Addition-ReSPonse (DSA-RSP) message and a Dynamic Service Change-ReSPonse (DSC-RSP) message.

17. The apparatus of claim 14, wherein the controller receives an ACKnowledge (ACK) message including an admitted service flow parameter from the base station and sets the admitted service flow parameter.

18. The apparatus of claim 17, wherein the ACK message comprises one of a DSA-ACK message and a DSC-ACK message.

19. The apparatus of claim 14, wherein the service flow comprises one of an individual service flow and a tunnel service flow.

20. A method for operating a base station in a wireless communication system using a multi-hop relay scheme, the method comprising: if a service flow change for a mobile station is requested, transmitting a request message requesting including a requested QoS parameter set for an admission control decision to a relay station in a data transmission path between a base station and the mobile station; if the requested QoS parameter set is unsupportable, receiving a response message to the request message from the relay station, wherein the response message is not forwarded from the relay station to a subordinate relay station corresponding to a next hop in the data transmission path; performing an admission control for the service flow based on the information included in the response message; and transmitting a message including the admitted service flow to the mobile station, wherein the response message includes a confirmation code indicating at least one of the unsupportability of the requested QoS parameter set and a QoS parameter set which the relay station can support, and wherein, if the requested QoS parameter set is supportable, the base station does not receive a response message from the relay station.

21. The method of claim 20, wherein the service flow change for the mobile station is requested when at least one of the mobile station requests a connection creation, when the base station requests a connection creation, the mobile station requests a service flow parameter change for a created connection, and the base station requests a service flow parameter change for the created connection.

22. The method of claim 20, wherein the service flow comprises one of an individual service flow and a tunnel service flow.

23. The method of claim 20, wherein the request message comprises one of a Dynamic Service Addition-REQuest (DSA-REQ) message and a Dynamic Service Change-REQuest (DSC-REQ) message.

24. The method of claim 20, wherein the response message comprises one of a Dynamic Service Addition-ReSPonse (DSA-RSP) message and a Dynamic Service Change-ReSPonse (DSC-RSP) message.

25. The method of claim 20, further comprising transmitting an ACKnowledge message including the admitted service flow parameter to the relay stations in the data transmission path.

26. The method of claim 25, wherein the ACK message comprises one of a DSA-ACK message and a DSC-ACK message.

* * * * *